(12) United States Patent
Gao et al.

(10) Patent No.: US 10,536,935 B2
(45) Date of Patent: Jan. 14, 2020

(54) REPORTING AND CONTROLLING METHODS FOR DRX PARAMETER AND TERMINAL MOVING VELOCITY AND DEVICES THEREOF

(71) Applicant: CHINA MOBILE COMMUNICATIONS CORPORATION, Beijing (CN)

(72) Inventors: Youjun Gao, Beijing (CN); Nan Hu, Beijing (CN); Chunfeng Cui, Beijing (CN)

(73) Assignee: CHINA MOBILE COMMUNICATIONS CORPORATION, Beijing (CN)

( * ) Notice: Subject to any disclaimer, the term of this patent is extended or adjusted under 35 U.S.C. 154(b) by 143 days.

(21) Appl. No.: 14/416,616

(22) PCT Filed: Jul. 23, 2013

(86) PCT No.: PCT/CN2013/079933
§ 371 (c)(1),
(2) Date: Jan. 22, 2015

(87) PCT Pub. No.: WO2014/015797
PCT Pub. Date: Jan. 30, 2014

(65) Prior Publication Data
US 2015/0271789 A1    Sep. 24, 2015

(30) Foreign Application Priority Data

Jul. 23, 2012  (CN) .......................... 2012 1 0256730

(51) Int. Cl.
*H04W 76/28*   (2018.01)
*H04W 72/04*   (2009.01)
(Continued)

(52) U.S. Cl.
CPC ......... *H04W 72/042* (2013.01); *H04W 4/027* (2013.01); *H04W 28/0289* (2013.01); *H04W 76/28* (2018.02); *H04W 72/0493* (2013.01)

(58) Field of Classification Search
CPC ....... H04W 72/04; H04W 28/02; H04W 4/02; H04W 76/04; H04W 76/048;
(Continued)

(56) References Cited

U.S. PATENT DOCUMENTS

2009/0253470 A1*  10/2009  Xu ...................... H04W 76/048
                                                    455/574
2011/0237266 A1    9/2011  Cai
2012/0170497 A1    7/2012  Zhang et al.

FOREIGN PATENT DOCUMENTS

CN        101656978 A    2/2010
CN         12487541 A    6/2012
(Continued)

*Primary Examiner* — Jae Y Lee
*Assistant Examiner* — Aixa A Guadalupe Cruz
(74) *Attorney, Agent, or Firm* — Workman Nydegger (57) ABSTRACT

Disclosed are reporting and controlling methods for DRX (Discontinuous Reception) parameter and terminal moving velocity and devices thereof, which are used to decrease the network resource wasting and reduce the terminal power consumption. The reporting and controlling method for DRX parameter includes the following steps: the network side sends indication information which indicates whether the terminal is permitted to report DRX reference parameter or DRX parameter configuration advice to the terminal, and the indication information is used to indicate the terminal to report DRX reference parameter or DRX parameter configuration advice when it receives the indication for permitting reporting reference parameter or DRX parameter configuration advice, and not report DRX reference parameter or DRX configuration advice when it receives the indication for not permitting reporting reference parameter or DRX
(Continued)

configuration advice. The method for reporting and controlling terminal moving velocity includes the following steps: sending indication information which indicates whether the terminal is permitted to report moving velocity to the terminal, or sending indication information which indicates the terminal to report moving velocity when it switches from idle state to connection state to the terminal.

15 Claims, 4 Drawing Sheets

(51) Int. Cl.
*H04W 4/02* (2018.01)
*H04W 28/02* (2009.01)

(58) Field of Classification Search
CPC ............... H04W 4/027; H04W 72/042; H04W 52/0216; H04W 28/0289
See application file for complete search history.

(56) References Cited

FOREIGN PATENT DOCUMENTS

| | | | | |
|---|---|---|---|---|
| CN | 101553022 B | * | 6/2012 | |
| CN | 102595573 A | | 7/2012 | |
| WO | WO 2011123744 A1 | * | 10/2011 | ............ H04W 24/10 |
| WO | WO-2011123744 A1 | * | 10/2011 | ............ H04W 24/10 |
| WO | WO-2013006196 A1 | * | 1/2013 | ............. H04B 15/00 |
| WO | WO 2013022392 A1 | * | 2/2013 | ............ H04W 76/02 |
| WO | WO-2013022392 A1 | * | 2/2013 | ............ H04W 76/02 |
| WO | PCT/CN13/79933 | | 10/2013 | |

* cited by examiner

REPORTING AND CONTROLLING METHODS FOR DRX PARAMETER AND TERMINAL MOVING VELOCITY AND DEVICES THEREOF

This application is a US National Stage of International Application No. PCT/CN2013/079933, filed on Jul. 23, 2013, designating the United States and claiming the priority of Chinese Patent Application No. 201210256730.9 filed with the Chinese Patent Office on Jul. 23, 2012 and entitled "Reporting and Controlling Methods for DRX Parameter and Terminal Moving Velocity and Devices Thereof". All of the aforementioned applications are incorporated herein in their respective entireties by this reference.

FIELD

This invention relates to wireless communication technology field, and particularly to a reporting and controlling method for DRX parameter and terminal moving velocity, and a device thereof.

BACKGROUND

With the rapid development of mobile internet technology, it creates significant impact on the wireless network. Conventional mobile internet services (such as mobile phone QQ services, etc.) have the following characteristic: a large amount of system messages, and a large amount of heartbeat packages and status update data packages. Such characteristic make the communication between the terminal and the network side very frequently, but the data size of each data package is small. Therefore, the impact on the air interface includes: the terminal frequently connects or releases resources, but the size of the data transmitted during each resource connection is small.

To solve above problems, the following two schemes has been introduced in the prior art: 1) the terminal reports DRX (Discontinuous Reception) reference parameter, and the terminal notifies the network side device of the DRX reference parameter, which is the DRX parameter to be configured by the network side, desired by the terminal, and the network side can properly configure the DRX parameter for the terminal; 2) when the terminal switches from the idle state to the connection state, the terminal reports its moving velocity.

However, there is no implementation of the two schemes above in the prior art. If the network side doesn't control the reporting of DRX reference parameter and the moving velocity by the terminal, the terminal may report the DRX reference parameter and the moving velocity at any time, which increases the spending of the signaling of the terminal, results in waste of network resources on the network side, and increases power consumption of the terminal.

Therefore, it is one of the problems to be solved in prior art how to control the reporting of the DRX parameter and the moving velocity by terminal devices.

SUMMARY

The embodiments in this invention provide a reporting and controlling methods for DRX parameter and the terminal moving velocity and a device thereof, which decrease network wasting and reduce the terminal power consumption.

A method of controlling DRX parameter reporting is provided in the embodiments of this invention, including:

transmitting, by a network side device, indication information to a terminal which indicates whether the terminal is permitted to report a DRX reference parameter or a DRX parameter configuration proposal, wherein, the indication information is used to indicate the terminal: to report the DRX reference parameter or the DRX parameter configuration proposal when the terminal receives the indication information for permitting reporting of the DRX reference parameter or the DRX parameter configuration proposal; and not to report the DRX reference parameter or the DRX configuration proposal when the terminal receives the indication information for not permitting reporting of the DRX reference parameter or the DRX configuration proposal.

A method of reporting DRX parameter is provided in the embodiments of the invention, including:

determining, by a terminal, whether the terminal satisfies a triggering condition, the triggering condition comprises: the terminal receives from a network side device indication information for permitting a reporting of the DRX reference parameter or a DRX parameter configuration proposal; or the terminal receives from the network side device a DRX parameter configured for the terminal; or the terminal detects a switching of power consumption state of the terminal; or the terminal receives from the network side device an indicator to reconfigure or update the DRX parameter; and reporting, by the terminal, the DRX reference parameter or the DRX parameter configuration proposal to the network side device upon determining that the terminal satisfies the triggering condition.

A base station is provided in the embodiments of the invention, including:

a transmitting unit, configured to transmit indication information to a terminal which indicates whether the terminal is permitted to report a DRX reference parameter or a DRX parameter configuration proposal; wherein the indication information is used to indicate the terminal to report the DRX reference parameter or the DRX parameter configuration proposal when the terminal receives the indication information for permitting reporting of the DRX reference parameter or the DRX parameter configuration proposal, and to indicate the terminal not to report the DRX reference parameter or the DRX configuration proposal when the terminal receives the indication information for not permitting reporting of the DRX reference parameter or the DRX configuration proposal.

A terminal is provided in the embodiments of the invention, including:

a determining unit, configured to determine whether the terminal satisfies a triggering condition; the triggering condition comprises: the terminal receives from a network side device indication information for permitting a reporting of a DRX reference parameter or a DRX parameter configuration proposal; or the terminal receives from the network side device a DRX parameter configured for the terminal; or the terminal detects a switch of power consumption state of the terminal; or the terminal receives from the network side device an indicator to reconfigure or update the DRX parameter; and a reporting unit, configured to report the DRX reference parameter or the DRX parameter configuration proposal to the network side when the terminal satisfies the triggering condition.

A method of controlling a reporting of a moving velocity of a terminal is provided in the embodiments of the invention, including:

transmitting indication information to the terminal which indicates whether the terminal is permitted to report its moving velocity, or transmitting indication information to the terminal which indicates the terminal to report its moving velocity when the terminal switches from an idle state to a connection state.

A method of reporting a moving velocity of a terminal is provided in the embodiments of the invention, including:

receiving from the network side device indication information which indicates whether it permits to report the moving velocity of the terminal; or receiving from the network side device indication information which indicates to report the moving velocity when switching from an idle state to a connection state.

Another base station is provided in the embodiments of the invention, including:

a transmitting unit, configured to transmit to a terminal indication information which indicates whether the terminal is permitted to report its moving velocity, or to transmit indication information which indicates the terminal to report its moving velocity when the terminal switches from an idle state to a connection state.

Another terminal is provided in the embodiments of the invention, including:

a receiving unit, configured to receive from the network side device indication information which indicates whether it permits to report a moving velocity of the terminal to the network side device, or to receive the indication information from the network side device which indicates to report the moving velocity when switching from an idle state to a connection state.

Some embodiments in this invention provide a method of reporting and controlling the DRX reference parameter and a device thereof. Because the network side device transmits indication information to the terminal which indicates whether the terminal is permitted to report DRX reference parameter or DRX parameter configuration proposal, so that the terminal can determine whether to report the DRX reference parameter or the DRX parameter configuration proposal according to the indication information. The terminal will report DRX reference parameter or DRX parameter configuration proposal only when the network side device permits the terminal to report it. Comparing to the reporting the DRX reference parameter or DRX parameter configuration proposal to the network side device at any time, the invention may reduce network resource consumption and save power of the terminal.

Some embodiments in this invention provide a method of reporting a moving velocity of the terminal and a device thereof. Because the network side device transmits indication information which indicates whether the terminal is permitted to report moving velocity, or indicates the terminal to report moving velocity when it switches from idle state to connection state, and such indication information contains velocity threshold, so that the terminal may report moving velocity only when its moving velocity exceeds the preset threshold or it switches from idle state to connection state according to the indication information. Therefore, comparing to reporting its moving velocity at any time, the invention may reduce network resource consumption, and save power of the terminal.

The following will describe other features and advantages of this invention. In addition, some part will become obvious or be understood using the embodiments. The purposes and other advantages of this invention can be realized using the description, claims, and specified structures in the drawings.

DETAILED DESCRIPTION OF THE EMBODIMENTS

The embodiments in this invention provide a reporting and controlling methods for DRX parameter and terminal moving velocity and a device thereof, which are used to decrease network wasting and reduce the terminal power consumption.

The following describes the preferred embodiments of this invention with reference to the drawings. It is to be understood that the preferred embodiments described here are for describing and illustrating this invention, but are not for limiting this invention. And when there are no conflicts, the embodiments and the features thereof in this invention may be combined.

First Embodiment

Figure 1:
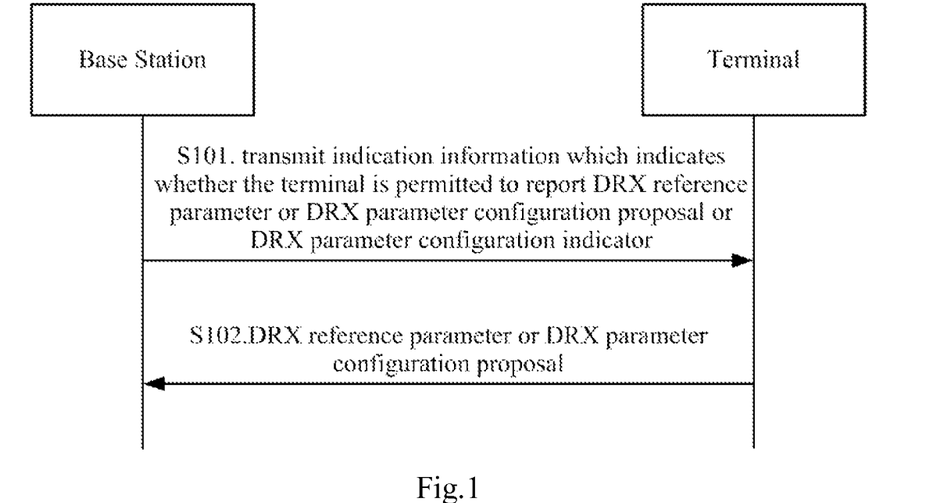
FIG. 1 is a flow chart of some embodiments illustrating the operations of controlling the DRX reference parameter reporting from the terminal by the network side.

As shown in FIG. 1, the method of controlling the DRX reference parameter reporting from the terminal by the network side provided in the embodiments in this invention include:

S101. The network side device transmits indication information which indicates whether the terminal is permitted to report DRX reference parameter or DRX parameter configuration proposal to the terminal. Normally, the DRX parameter configuration proposal can be equivalent to the DRX parameter configuration indication. Therefore, in this embodiment, the indication information transmitted from the network side to the terminal can be indication information whether to permit the terminal to report DRX reference parameter or DRX parameter configuration proposal or DRX parameter configuration indication. To be short, DRX parameter configuration proposal is used collectively hereunder.

And, the indication information transmitted from the network side device to the terminal is used to indicate the terminal: to report DRX reference parameter or DRX parameter configuration proposal when the terminal receives the indication information for permitting reporting reference parameter or DRX parameter configuration proposal; and not to report DRX reference parameter or DRX configuration proposal when the terminal receives the indication information for not permitting reporting DRX reference parameter or DRX configuration proposal. In this embodiment, the DRX parameter is the DRX parameter actually configured by the network side for the terminal; the DRX reference parameter is the DRX parameter to be configured by the network side device, desired by the terminal; and the DRX parameter configuration proposal is power consumption state desired by the terminal, such as default state or power saving state or DRX configuration state with shorter configuration cycle.

During application, the network side device transmits indication information which indicates whether the terminal is permitted to report DRX reference parameter or DRX parameter configuration proposal to the terminal in different scenes. For example, the transmitting of the indication information from the network side device to the terminal may include the following cases:

1) When the network side device is configuring DRX parameters for the terminal, the network side device transmits indication information to the terminal permitting the reporting of DRX reference parameter or DRX parameter configuration proposal, which means the network side device doesn't allow the terminal to report DRX reference parameter or DRX parameter configuration proposal in other time.

2) After the network side device receives DRX reference parameter or DRX parameter configuration proposal reported from the terminal, it transmits indication information to the terminal not permitting the reporting of DRX reference parameter, which means the terminal is not allowed to report DRX reference parameter when it has reported to the network side DRX reference parameter or DRX parameter configuration proposal and doesn't receive from the base station an indicator to reconfigure or update the DRX parameter.

3) The network side device transmits indication information to the terminal permitting the reporting of DRX reference parameter or DRX parameter configuration proposal, and the indication information indicates the terminal to report DRX reference parameter or DRX parameter configuration proposal after receiving the DRX parameter from the network side device. In other words, the network side device permits the terminal to report DRX reference parameter or DRX parameter configuration proposal after receiving the DRX parameter configured by the network side.

4) The network side device transmits indication information to the terminal permitting to report DRX reference parameter or the DRX parameter configuration proposal, and the indication information is used to indicate the terminal to report the DRX reference parameter or the DRX parameter configuration proposal when the terminal switches its power consumption state, which means the network side device controls the terminal to report DRX reference parameter or DRX parameter configuration proposal only when the terminal switches its power consumption state, for example, from DRX parameter configuration in a default state to the DRX parameter configuration in a power saving state and vice versa, or from DRX parameter configuration in default state to the DRX parameter configuration with a shorter configuration cycle and vice versa. The DRX parameter configuration in the default state is the default DRX parameter configuration of the network side device, or the current DRX parameter configuration configured for the terminal.

S102. The network side device receives DRX reference parameter or DRX parameter configuration proposal reported from the terminal.

In practice, when the network side transmits indication information to the terminal to permit to report DRX reference parameter or DRX parameter configuration proposal, the terminal reports to the network side device the DRX parameter desired by the terminal, or the DRX parameter configuration proposal after receiving such indication information, or it reports to the network side device DRX reference parameter or DRX parameter configuration proposal when it switches the power consumption state.

Figure 2:
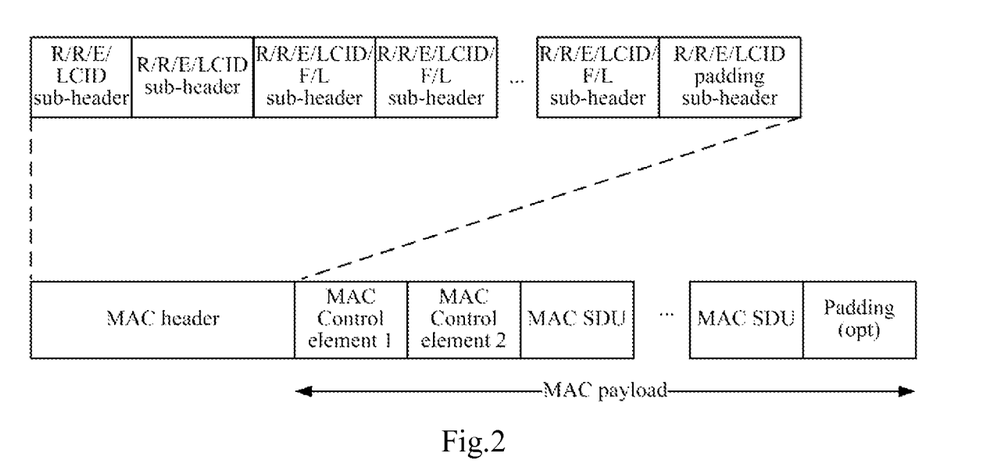
FIG. 2 is an illustration of MAC layer signaling format with the new defined LCID according to some embodiments of the invention.

Preferably, the indication information from the network side to the terminal can be carried in broadcast message or dedicated signalling, and more preferably, the dedicated signalling can be but not limited to RRC (Radio Resource Control) layer signalling and MAC (Media Access Control) layer signalling. When the indication information is carried in the MAC layer signalling, it requires defining new LCID (Logic Control Identity) to represent corresponding MAC layer signalling, as shown in FIG. 2. If the network side uses RRC layer signalling to carry the indication information, it may use the existing RRC reconfiguration message to carry the indication information, and specifically, it can add new indication to the existing RRC reconfiguration message.

Second Embodiment

Figure 3:
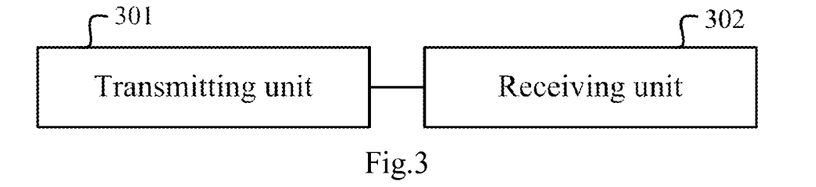
FIG. 3 is a first structural illustration of the base station according to some embodiments of the invention.

With the same inventive concept as first embodiment, the second embodiment provides a base station to realize the above method of controlling DRX reference parameter reporting, as shown the FIG. 3 which is a structural illustration of the base station provided in the embodiments of this invention, including:

A transmitting unit 301 which is configured to transmit indication information to the terminal which indicates whether the terminal is permitted to report a DRX reference parameter or a DRX parameter configuration proposal.

The indication information transmitted by the transmitting unit 301 is used to indicate the terminal to report the DRX reference parameter or DRX parameter configuration proposal when the terminal receives the indication information for permitting the reporting of reference parameter or DRX parameter configuration proposal, and to indicate the terminal not to report the DRX reference parameter or DRX parameter configuration proposal when the terminal receives the indication information for not permitting the reporting of DRX reporting reference parameter or DRX parameter configuration proposal. Specifically, when the transmitting unit 301 configures DRX parameters for the terminal, the transmitting unit 301 transmits indication information to the terminal permitting the reporting of DRX reference parameter or DRX parameter configuration proposal; or after receiving DRX reference parameter or DRX parameter configuration proposal reported from the terminal, the transmitting unit 301 transmits indication information to the terminal not permitting the reporting of DRX reference parameter or DRX parameter configuration proposal; or the transmitting unit 301 transmits indication information to the terminal for permitting to report DRX reference parameter or DRX parameter configuration proposal, the indication information indicates the terminal to report DRX reference parameter or DRX parameter configuration proposal after receiving the DRX parameter from the network side device; or the transmitting unit 301 transmits indication information to the terminal for permitting to report DRX reference parameter or the DRX parameter configuration proposal, and such indication information is used to indicate the terminal to report the DRX reference parameter or the DRX parameter configuration proposal when the terminal shifts in power consumption state.

In practice, the base station provided by the embodiments in this invention may further include:

A receiving unit 302, which is configured to receive DRX reference parameter or DRX parameter configuration proposal reported from the terminal when the transmitting unit 301 transmits indication information to the terminal to permit the terminal to report the DRX reference parameter or DRX parameter configuration proposal.

Specifically, the receiving unit 302 can be further configured to receive DRX reference parameter or DRX parameter configuration proposal reported by the terminal when the terminal device shifts power consumption state.

Wherein, the transmitting unit 301 specifically uses broadcast message or dedicated signalling, and the dedicated signalling can be but not limited to RRC layer signalling and MAC layer signalling. If the indication information is carried in the RRC layer signalling, the transmitting unit 301 may use existing RRC reconfiguration message to carry the indication information, and specifically, it can add new indication to existing RRC reconfiguration message.

The base station provided by the embodiments in this invention can further include:

A definition unit, which is configured to define a corresponding MAC layer signalling represented by new LCID when the transmitting unit 302 uses MAC layer signalling to carry indication information.

Third Embodiment

Figure 4:
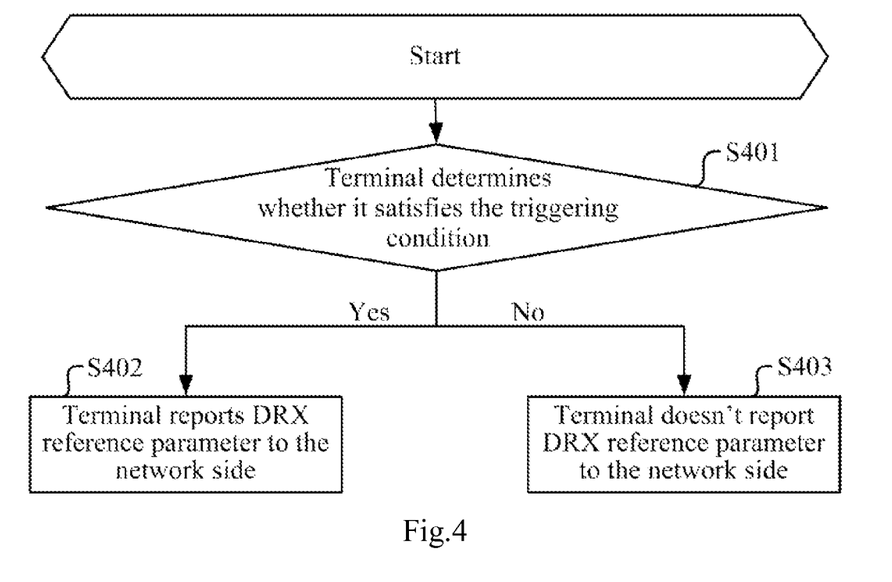
FIG. 4 is a flow chart illustrating reporting DRX reference parameter by the terminal according to some embodiments of the invention.

With the same inventive concept as the first embodiment, the third embodiment is a flow chart of some embodiments illustrating the reporting of DRX reference parameters by the terminal, as shown FIG. 4, including the following operations:

S401. The terminal determines if the terminal satisfies the triggering condition. If so, perform operation S402; if not, perform operation S403.

S402. The terminal reports to the network side device the DRX reference parameter or the DRX parameter configuration proposal.

S403. The terminal doesn't report to the network side the DRX reference parameter or the DRX parameter configuration proposal.

Wherein the triggering condition can be but not limited to the following:

1) The terminal receives from the network side device the indication information for permitting the reporting of DRX reference parameter or DRX parameter configuration proposal.

2) The terminal receives from the network side device the DRX parameter configured for the terminal, and then reports DRX reference parameter or DRX parameter configuration proposal to the network side device.

3) The terminal detects a switch in power consumption state of the terminal, and reports DRX reference parameter or DRX parameter configuration proposal to the network side device. For example, when the terminal detects that it switches from default state to power saving state or vice versa, or it switches from DRX configuration state with a shorter configuration cycle to default state or vice versa, it reports DRX reference parameter or DRX parameter configuration proposal to the network side. The DRX parameter configuration in default state is the default DRX parameter configuration of the network side device, or is the DRX parameter configuration configured by the current network side device for the terminal.

4) The terminal receives from the network side device an indicator to reconfigure or update the DRX parameter.

In practice, the terminal can but is not limited to use MAC layer signalling, RRC layer signalling or physical layer signalling to carry DRX reference parameter or the DRX parameter configuration proposal, and when using MAC layer signalling to carry the DRX reference parameter or the DRX parameter configuration proposal, it requires to define new LCID to represent the corresponding MAC layer signalling, and such format is shown in FIG. 2.

Comparing to Embodiment 1 where the network side device controls the reporting of the DRX reference parameter by the terminal device, this Embodiment uses independent event triggering configuration, in which triggering condition is set up, and the terminal determines whether terminal satisfies the triggering condition, and then the terminal reports the DRX reference parameter only when satisfying triggering condition.

The Fourth Embodiment

Figure 5:
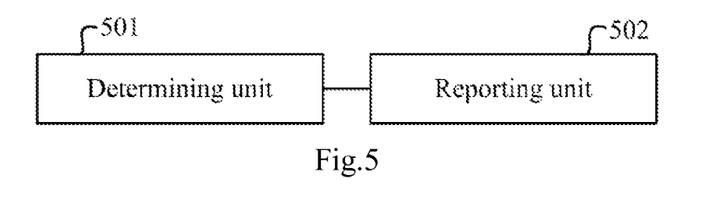
FIG. 5 is a first structural illustration of the terminal according to some embodiments of the invention.

The fourth embodiment is a base station corresponding to the third embodiment, as shown in FIG. 5 which is a structural illustration of the base station in some embodiments of this invention, including:

A determining unit, which is configured to determine whether the terminal satisfies the triggering condition.

Such triggering condition include but is not limited to: the terminal receives from the network side device the indication information for permitting the reporting of DRX reference parameter or the DRX parameter configuration proposal; or the terminal receives from the network side device DRX parameter configured for the terminal; or the terminal detects a shift in power consumption state of the terminal; or the terminal receives from the network side device an indicator to reconfigure or update the DRX parameter;

A reporting unit 502, which is configured to report to the network side device the DRX reference parameter or the DRX parameter configuration proposal when the terminal satisfies the triggering condition.

In practice, the reporting unit 502 can use MAC layer signalling, RRC layer signalling or physical layer signalling to carry the DRX reference parameter or the DRX parameter configuration proposal, and when using MAC layer signalling to carry the DRX reference parameter or the DRX parameter configuration proposal, it requires to define new LCID to represent the corresponding MAC layer signalling.

Some embodiments in this invention provide a method of reporting and controlling the DRX reference parameter and a device thereof. Because the network side transmits indication information to the terminal which indicates whether the terminal is permitted to report DRX reference parameter or DRX parameter configuration proposal, and the terminal can determine whether to report the DRX reference parameter or the DRX parameter configuration proposal according to the indication information. When the terminal receives the indication information for permitting the reporting of reference parameter or DRX parameter configuration proposal, the terminal reports DRX reference parameter. Comparing to the reporting the DRX reference parameter or DRX parameter configuration proposal to the network side at any time, the invention may reduce network resource consumption, and save power consumption of the terminal.

The Fifth Embodiment

Figure 6:
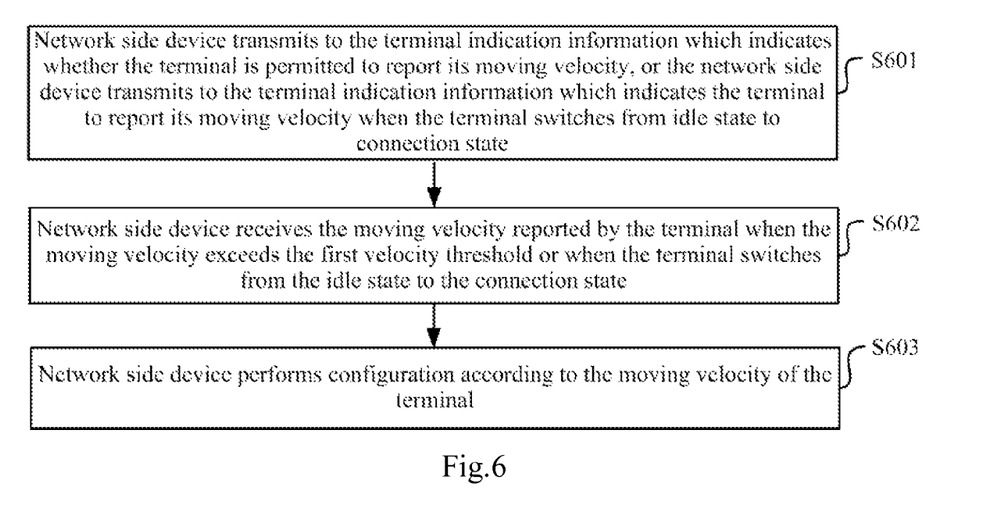
FIG. 6 is a flow chart illustrating the operations of controlling the reporting of terminal moving velocity on the base station side according to some embodiments of the invention.

The fifth embodiment provides a method of controlling the reporting of terminal moving velocity, as shown in FIG. 6 which is a flow chart of the operations at the base station side of implementing the method of controlling reporting terminal moving velocity, including the following operations:

S601. The network side device transmits to the terminal indication information which indicates whether the terminal is permitted to report its moving velocity, or the network side device transmits to the terminal indication information which indicates the terminal to report its moving velocity when the terminal switches from idle state to connection state.

In practice, if the network side transmits to the terminal the indication information which indicates that the terminal is permitted to report its moving velocity, the indication information transmitted from the network side device to the terminal may include a first velocity threshold, and for convenience, the first velocity threshold is represent by K. Preferably, it can reuse the parameter $N_{CR\_H}$ indicating the terminal in high speed moving state in existed protocol as K, or it can reuse the parameter $N_{CR\_M}$ indicating the terminal in high speed moving state in existed protocol as K, or K can be the number N of cells which terminal passes within a defined time T, or K can be the absolute velocity, etc.

S602. The network side device receives the moving velocity reported by the terminal when the moving velocity of the terminal exceeds the first velocity threshold or when the terminal switches from the idle state to the connection state.

In practice, when the terminal receives the indication information from the network side device, it calculates its moving velocity. Calculating the moving velocity of the terminal is the prior art, which is not further described here.

Preferably, the information reported by the terminal is 1 bit. The terminal can report its moving velocity using MAC layer signalling, RRC layer signalling or physical layer signalling, or the terminal device can report its moving velocity when transmitting RRC establish complete message to the network side device. When the terminal reports its moving velocity using MAC layer signalling, it requires to define a new LCID to represent the corresponding MAC layer signalling, the format of which is shown in FIG. 2.

S603. The network side device performs configuration according to the moving velocity of the terminal.

Specifically, the network side device may first determine whether the moving velocity of the terminal exceeds the second velocity threshold. If so, the network side needs to release RRC connection with the terminal, allowing the terminal to enter into idle state, and avoiding the signalling consumption from switching. If not, the network side device may prolong the releasing time of the RRC connection with the terminal or may maintain RRC connection with the terminal. When the releasing time of the RRC connection increases, the switch frequency of the terminal between connection state and idle state reduces significantly, therefore the uplink\downlink controlling signalling overhead decreases significantly.

The Sixth Embodiment

Figure 7:
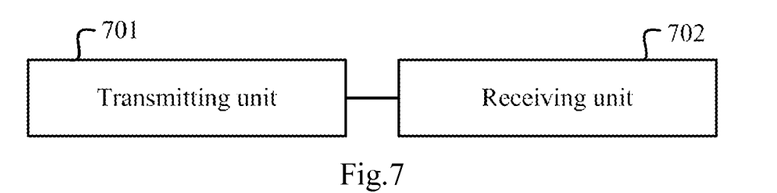
FIG. 7 is a second structural illustration of the base station according to some embodiments of the invention.

With the same inventive concept in the fifth embodiment, the sixth embodiment provides a base station, as shown in FIG. 7 which is a structural illustration of the base station, including:

A transmitting unit 701, which is configured to transmit to the terminal indication information which indicates whether the terminal is permitted to report its moving velocity, or to transmit indication information to the terminal which indicates the terminal to report its moving velocity when the terminal switches from idle state to connection state.

When the indication information, which indicates whether the terminal is permitted to report its moving velocity, is transmitted to the terminal, such indication information contains a first velocity threshold.

A receiving unit 702, which is configured to receive the moving velocity reported by the terminal when the moving velocity of the terminal exceeds the first velocity threshold, or when the terminal switches from the idle state to the connection state.

In practice, the base station provided in the embodiments in this invention may further include:

A determining unit, which is configured to determine whether the moving velocity of the terminal exceeds the second velocity threshold;

A releasing unit, which is configured to release the RRC connection with the terminal when a determination result of the determining unit is yes.

A maintaining unit, which is configured to maintain RRC connection with the terminal when the determination result of the determining unit is no.

A prolonging unit, which is configured to prolong the releasing time of the RRC connection with the terminal when the determination result of the determining unit is no.

The Seventh Embodiment

Figure 8:
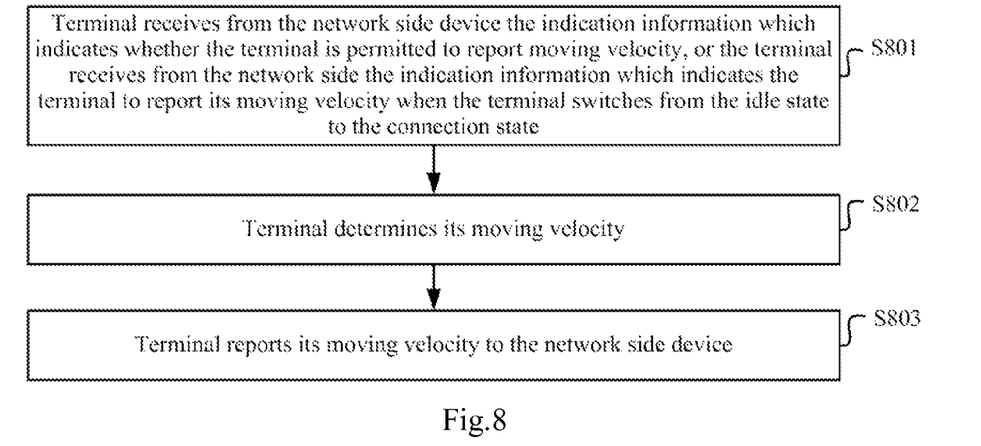
FIG. 8 is a flow chart illustrating the operations of reporting of moving velocity on the base station side according to some embodiments of the invention.

With the same inventive concept in the fifth embodiment, the seventh embodiment provides a method of controlling reporting of terminal moving velocity on the terminal side, as shown in FIG. 6 which is a flow chart of the operations on the terminal side of implementing the method of controlling reporting terminal moving velocity, including the following operations:

S801. The terminal receives from the network side device the indication information which indicates whether the terminal is permitted to report moving velocity, or the terminal receives from the network side the indication information which indicates the terminal to report its moving velocity when the terminal switches from the idle state to the connection state.

When the terminal receives from the network side the indication information which indicates whether the terminal is permitted to report moving velocity, the indication information contains a preset velocity threshold, assumed that K represents the velocity threshold for example. The method of determining K is the same as that in the fifth embodiment, which is not repeated here.

S802. The terminal determines its moving velocity.

In practice, the terminal determines its moving velocity when it receives indication information from the network side device which indicates that the terminal is permitted to report moving velocity, or when the terminal switches from idle state to connection state.

S803. The terminal reports its moving velocity to the network side device.

In practice, when the terminal receives the indication information which indicates that the terminal is permitted to report its moving velocity, and if the determined moving velocity exceeds preset velocity threshold, the terminal reports its moving velocity to the network side device, or when the terminal switches from the idle state to the connection state, the terminal reports its moving velocity to the network side device.

The operations in which the terminal reports to the network side device its moving velocity is the same as those in the fifth embodiment, which are repeated here. For example, the terminal can use MAC layer signalling, RRC layer signalling or physical layer signalling to report its moving velocity, and when using MAC layer signalling to report its moving velocity, the terminal requires to define a new LCID to represent the corresponding MAC layer signalling, the structure of which is shown in FIG. 2.

It is to be understood that, in the fifth embodiment and the embodiments above, whether to report moving velocity is controlled by the network side device. In practice, the terminal device may report its moving velocity on its own initiative upon triggering event, when the terminal determines that its moving velocity exceeds the preset velocity threshold, it can actively report its moving velocity, the method to defining K is the same as that in the fifth embodiment, which is not repeated here.

The Eighth Embodiment

Figure 9:
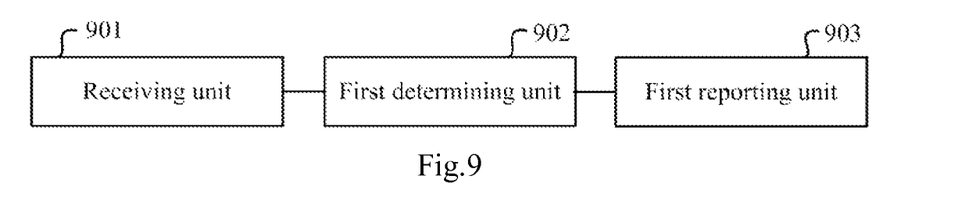
FIG. 9 is a second structural illustration of the terminal according to some embodiments of the invention.

The eighth embodiment is the terminal corresponding the seventh embodiment, as shown in FIG. 9 which is a possible structural illustration of the terminal, including:

A receiving unit 901, which is configured to receive from the network side device indication information which indicates whether it permits to report moving velocity, the indication information includes a preset velocity threshold.

A first determining unit 902, which is configured to determine the moving velocity of the terminal.

A reporting unit 903, which is configured to report to the network side device the moving velocity of the terminal when the moving velocity determined by the first determining unit 902 exceeds the preset velocity threshold.

Figure 10:
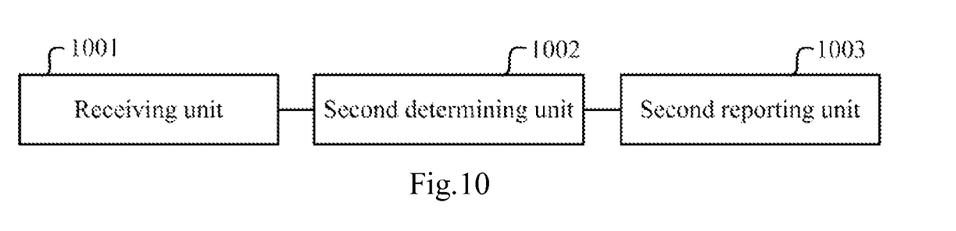
FIG. 10 is a third structural illustration of the terminal according to some embodiments of the invention.

As shown in FIG. 10, another structure of the terminal may be further illustrated, including:

A receiving unit 1001, which is configured to receive from the network side the indication information which indicates to report the moving velocity when switching from idle state to connection state.

A second determining unit 1002, which is configured to determine the moving velocity of the terminal when the terminal switches from idle state to connection state.

A second reporting unit 1003, which is used to report to the network side the moving velocity of the terminal determined by the second determining unit 1002.

Specifically, the first reporting unit 903 or the second reporting unit 1003 can use MAC layer signalling, RRC layer signalling or physical layer signalling to report the moving velocity, and when using MAC layer signalling to report moving velocity of the terminal, it requires to define a new LCID to represent the MAC layer signalling, the format of which is shown in FIG. 2.

Some embodiments in this invention provide a method of reporting terminal moving velocity and a device thereof. Because the network side device transmits indication information which indicates whether the terminal is permitted to report moving velocity, or indicates the terminal to report moving velocity when it switches from idle state to connection state, and such indication information carries the velocity threshold, thus the terminal may report moving velocity only when its moving velocity exceeds the preset threshold or it switches from idle state to connection state according to the indication information. Therefore, comparing to the reporting of moving velocity from the terminal to the network side device at any time, the present invention may reduce network resource consumption, and save power of the terminal.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:
1. A method of controlling Discontinuous Reception (DRX) reference parameter or DRX parameter configuration proposal reporting, comprising:

transmitting, by a network side device, indication information to a terminal which indicates whether the terminal is permitted to report a DRX reference parameter or a DRX parameter configuration proposal, wherein the DRX reference parameter is a DRX parameter to be configured by the network side device, desired by the terminal, the DRX parameter configuration proposal is a power consumption state desired by the terminal, and wherein:

the indication information is used to indicate the terminal: to report the DRX reference parameter or the DRX parameter configuration proposal when the terminal receives the indication information for permitting reporting of the DRX reference parameter or the DRX parameter configuration proposal; and not to report the DRX reference parameter or the DRX parameter configuration proposal when the terminal receives the indication information for not permitting reporting of the DRX reference parameter or the DRX parameter configuration proposal.

2. The method according to claim 1, wherein transmitting, by the network side device, indication information to the terminal which indicates whether the terminal is permitted to report the DRX reference parameter or the DRX parameter configuration proposal comprises:

the network side device transmits indication information to the terminal for permitting the reporting of DRX reference parameter or the DRX parameter configuration proposal when the network side device configures a DRX parameter for the terminal; or the network side device transmits indication information to the terminal for not permitting the reporting of DRX reference parameter or DRX parameter configuration proposal after the network side device receives DRX reference parameter or DRX parameter configuration proposal reported from the terminal; or the network side device transmits indication information to the terminal for permitting the reporting of DRX reference parameter or the DRX parameter configuration proposal, wherein the indication information indicates the terminal to report the DRX reference parameter after receiving the DRX parameter configured by the network side device for the terminal; or the network side device transmits indication information to the terminal for permitting the reporting of the DRX reference parameter or the DRX parameter configuration proposal, wherein the indication information is used to indicate the terminal to report the DRX reference parameter or the DRX parameter configuration proposal when the terminal switches its power consumption state.

3. The method according to claim 2, wherein when the network side device transmits indication information to the terminal for permitting the reporting of the DRX reference parameter or the DRX parameter configuration proposal, the method further comprises:

receiving, by the network side device, the DRX reference parameter or the DRX parameter configuration proposal reported by the terminal; and wherein the DRX parameter configuration proposal comprises: switch from a DRX parameter configuration in a default state to a DRX parameter configuration in a more power saving state, or switch from the DRX parameter configuration in the more power saving state to the DRX parameter configuration in the default state, or switch from the DRX parameter configuration in the default state to a DRX parameter configuration with a shorter configuration cycle, or switch from the DRX parameter configuration with the shorter configuration cycle to the DRX parameter configuration in the default state.

4. The method according to claim 3, wherein the DRX parameter configuration in the default state is a default DRX parameter configuration of the network side device, or is a DRX parameter configuration configured by a current network side device for the terminal.

5. The method according to claim 1, wherein the indication information is carried in a broadcast message or dedicated signalling by the network side device, and the dedicated signalling comprises Radio Resource Control (RRC) layer signalling or Media Access Control (MAC) layer signalling.

6. The method according to claim 5, wherein when the indication information is carried in the MAC layer signalling by the network side device, the MAC layer signalling is represented by a preset Logic Control Identity (LCID); or when the indication information is carried in the RRC layer signalling by the network side device, the indication information is carried in an RRC reconfiguration message.

7. A method of reporting DRX reference parameter or DRX parameter configuration proposal, comprising:

determining, by a terminal, whether the terminal satisfies a triggering condition, the triggering condition comprises: the terminal receives from a network side device indication information for permitting a reporting of the DRX reference parameter or the DRX parameter configuration proposal; and reporting, by the terminal, the DRX reference parameter or the DRX parameter configuration proposal to the network side device upon determining that the terminal satisfies the triggering condition, wherein the DRX reference parameter is a DRX parameter to be configured by the network side device, desired by the terminal, the DRX parameter configuration proposal is a power consumption state desired by the terminal.

8. The method according to claim 7, wherein the DRX parameter configuration proposal comprises: switch from a DRX parameter configuration in a default state to a DRX parameter configuration in a more power saving state, or switch from the DRX parameter configuration in the more power saving state to the DRX parameter configuration in the default state, or switch from the DRX parameter configuration in the default state to a DRX parameter configuration with a shorter configuration cycle, or switch from the DRX parameter configuration with the shorter configuration cycle to the DRX parameter configuration in the default state.

9. The method according to claim 8, wherein the DRX parameter configuration in the default state is a default DRX parameter configuration of the network side device, or is a DRX parameter configuration configured by a current network side device for the terminal.

10. The method according to claim 7, wherein the DRX reference parameter or the DRX parameter configuration proposal is carried in the MAC layer signalling, RRC layer signalling or physical layer signalling by the terminal.

11. The method according to claim 10, wherein when the DRX reference parameter is carried in the MAC layer signalling by the terminal, the MAC layer signalling is represented by a preset Logic Control Identity (LCID).

12. A base station, comprising:
a memory; and
a processor;

wherein the memory stores instructions executable by the processor, wherein the instructions, when executed by the processor, cause the processor to:

transmit indication information to a terminal which indicates whether the terminal is permitted to report a DRX reference parameter or a DRX parameter configuration proposal, wherein the DRX reference parameter is a DRX parameter to be configured by the network side device, desired by the terminal, the DRX parameter configuration proposal is a power consumption state desired by the terminal; and wherein the indication information is used to indicate the terminal to report the DRX reference parameter or the DRX parameter configuration proposal when the terminal receives the indication information for permitting reporting of the DRX reference parameter or the DRX parameter configuration proposal, and to indicate the terminal not to report the DRX reference parameter or the DRX parameter configuration proposal when the terminal receives the indication information for not permitting reporting of the DRX reference parameter or the DRX parameter configuration proposal.

13. The base station according to claim 12, wherein the processor is configured to carry the indication in a broadcast message or dedicated signalling, and the dedicated signalling comprises Radio Resource Control (RRC) layer signalling or Media Access Control (MAC) layer signalling.

14. A terminal, comprising:
a memory; and
a processor;
wherein the memory stores instructions executable by the processor, wherein the instructions, when executed by the processor, cause the processor to:
determine whether the terminal satisfies a triggering condition; the triggering condition comprises: the terminal receives from a network side device indication information for permitting a reporting of a DRX reference parameter or a DRX parameter configuration proposal; and
report the DRX reference parameter or the DRX parameter configuration proposal to the network side when the terminal satisfies the triggering condition, wherein the DRX reference parameter is a DRX parameter to be configured by the network side device, desired by the terminal, the DRX parameter configuration proposal is a power consumption state desired by the terminal.

15. The terminal according to claim 14, wherein the processor is configured to carry the DRX reference parameter or the DRX parameter configuration proposal in MAC layer signalling, RRC layer signalling or physical layer signalling.

* * * * *